United States Patent [19]

Barry et al.

[11] 3,852,648
[45] Dec. 3, 1974

[54] CONTROL CIRCUIT

[75] Inventors: Vincent T. Barry; George T. Privon, both of Camillus, N.Y.

[73] Assignee: Carrier Corporation, Syracuse, N.Y.

[22] Filed: Feb. 15, 1973

[21] Appl. No.: 332,858

Related U.S. Application Data

[63] Continuation of Ser. No. 146,710, May 25, 1971, abandoned.

[52] U.S. Cl. .............. 318/221 H, 318/229, 62/158, 62/230
[51] Int. Cl. ..................... H02p 1/44, G05d 23/32
[58] Field of Search ............... 62/158, 228, 230; 318/221 E, 221 D, 221 H, 221 R, 229

[56] References Cited
UNITED STATES PATENTS

| | | | |
|---|---|---|---|
| 3,054,271 | 9/1962 | McGrath et al. | 62/228 X |
| 3,298,192 | 1/1967 | Morgan | 62/228 X |
| 3,303,402 | 2/1967 | Martin | 318/221 R |
| 3,358,468 | 12/1967 | Shaw | 62/228 X |
| 3,566,225 | 2/1971 | Poulsen | 318/221 E |

*Primary Examiner*—G. Z. Rubinson
*Attorney, Agent, or Firm*—J. Raymond Curtin; Barry E. Deutsch

[57] ABSTRACT

An air conditioning system is provided to supply treated air to an area. The system includes a refrigeration unit comprising a motor-driven compressor, a condenser, an evaporator, and expansion means. The motor includes a run winding and a start or auxiliary winding connected in parallel. A run capacitor is connected in series with the auxiliary winding of the motor. A positive temperature coefficient thermistor is connected in parallel with the run capacitor. The flow of current to the auxiliary winding passes through both the positive temperature coefficient thermistor and capacitor upon starting and passes through substantially only the capacitor during normal running conditions.

7 Claims, 6 Drawing Figures

CONTROL CIRCUIT

This is a continuation, of application Ser. No. 146,710 filed May 25, 1971 now abandoned.

BACKGROUND OF THE INVENTION

The utilization of single-phase induction motors to drive the compressor of a refrigeration unit has become increasingly prevalent. Such refrigeration unit, including the compressor, condenser evaporator, and expansion means is typically employed in an air conditioning system, such as a room air conditioner.

Various types of single-phase induction motors, such as split-phase, permanent split capacitor, and capacitor start motors have been used to drive the compressor of a refrigeration unit. Each of these types of motors includes an auxiliary or start winding displaced in magnetic position from and connected in parallel with, a main winding. The use of the auxiliary winding is required since a single-phase motor has zero starting torque.

Each of the above mentioned motors has some desirable features. However, each of the motors represents a compromise between optimum starting and optimum running characteristics.

Another type of single phase motor is the capacitor start, capacitor run motor. The start capacitor is optimized for starting conditions, whereas the run capacitor is optimized for running conditions. In open motor applications a centrifugal switch is generally employed to replace the start capacitor with the run capacitor after the motor has reached a predetermined speed. In hermetic systems, this is accomplished by means of a current or voltage actuated relay.

Although such motors perform efficiently due to the optimization of the two capacitors, the motors have increased maintenance costs and lower reliability, partially due to failure of the centrifugal switch or relay to operate satisfactorily. In addition, such motors are relatively expensive due to the several capacitors employed in the control circuit. These motors are therefore unsuitable for the highly competitive and cost conscious air conditioning industry.

A variation of the capacitor start, capacitor run motor is shown in U.S. Pat. No. 3,303,402, issued Feb. 7, 1967, in the name of Robert L. Martin. The circuit disclosed in the above referred to patent, shows a plurality of positive temperature coefficient thermistors employed to actuate a plurality of capacitors when normal run conditions have been obtained. Such circuit, due to the cost and complexity thereof, is unsuitable for refrigeration units employed in air conditioning systems.

It is therefore an object of this invention to provide a control to operate the compressor motor of a refrigeration unit employed in an air conditioning system, one which is relatively inexpensive to manufacture and install, but yet provides optimum starting and running characteristics.

SUMMARY OF THE INVENTION

This invention relates to an air conditioning system including a refrigeration unit having a motor-driven compressor, a condenser, an evaporator and expansion means. The motor employed to drive the compressor is of the type known as a single-phase motor. In series with the auxiliary or start winding of the single-phase motor is a positive temperature coefficient thermistor or other temperature responsive resistance element, having the characteristics that the resistance thereof increases as a function of its temperature. A capacitor is connected in parallel with the resistance element and also in series with the start winding.

Upon startup of the compressor motor, the resistance of the element is low so the starting current is supplied through both the resistance element and capacitor to the auxiliary winding. By employing both the resistance element and capacitor for starting the motor, the desired torque may be obtained. Once the motor has attained a predetermined speed, the resistance of the thermistor has increased to a level such that substantially all flow of current therethrough is prevented. The current then flows to the auxiliary winding through the capacitor.

The capacitor is optimized for attaining the desired running characteristics for the motor; whereas the thermistor is sized for attaining the desired starting characteristics for the motor.

In an alternate embodiment, the flow of current through the positive temperature coefficient thermistor during starting conditions, operates to trigger a solid state switch into a conducting state. The switch, when in the conducting state, permits the flow of current through a start capacitor and through the resistance element to the auxiliary winding. When running conditions have been obtained and the resistance of the thermistor has increased, the flow of current to the solid state switch is substantially interrupted to place same in a non-conducting state. The flow of current to the auxiliary winding then passes through a run capacitor. The utilization of a solid state switch in series with the temperature responsive resistance element permits the employment of a smaller resistance element. The start capacitor is then employed in parallel with the resistance element to provide the desired starting torque.

A further embodiment utilizes the self-heating effect of the thermistor to obtain a control which prevents the restarting of the compressor motor for a predetermined period of time after the supply of current thereto has been interrupted. A switch is employed which is responsive to the temperature of the thermistor. During normal running conditions, even though the temperature of the thermistor has increased to open the switch, a bypass circuit about the switch precludes the switch from having any effect on the operation of the compressor motor. However, upon deenergization of the compressor motor, the temperature of the thermistor remains at a high level to maintain the switch in an open position. The compressor cannot be restarted until the temperature of the thermistor and switch have cooled to their normal level. In addition, by maintaining the switch open until the temperature of the thermistor returns to its normal level, the passage of current to the auxiliary winding, when starting, is insured.

The specific details of the invention and their mode or function will be made most manifest and particularly pointed out in conjunction with the accompanying drawings.

DESCRIPTION OF THE PREFERRED EMBODIMENTS

Figure 1:
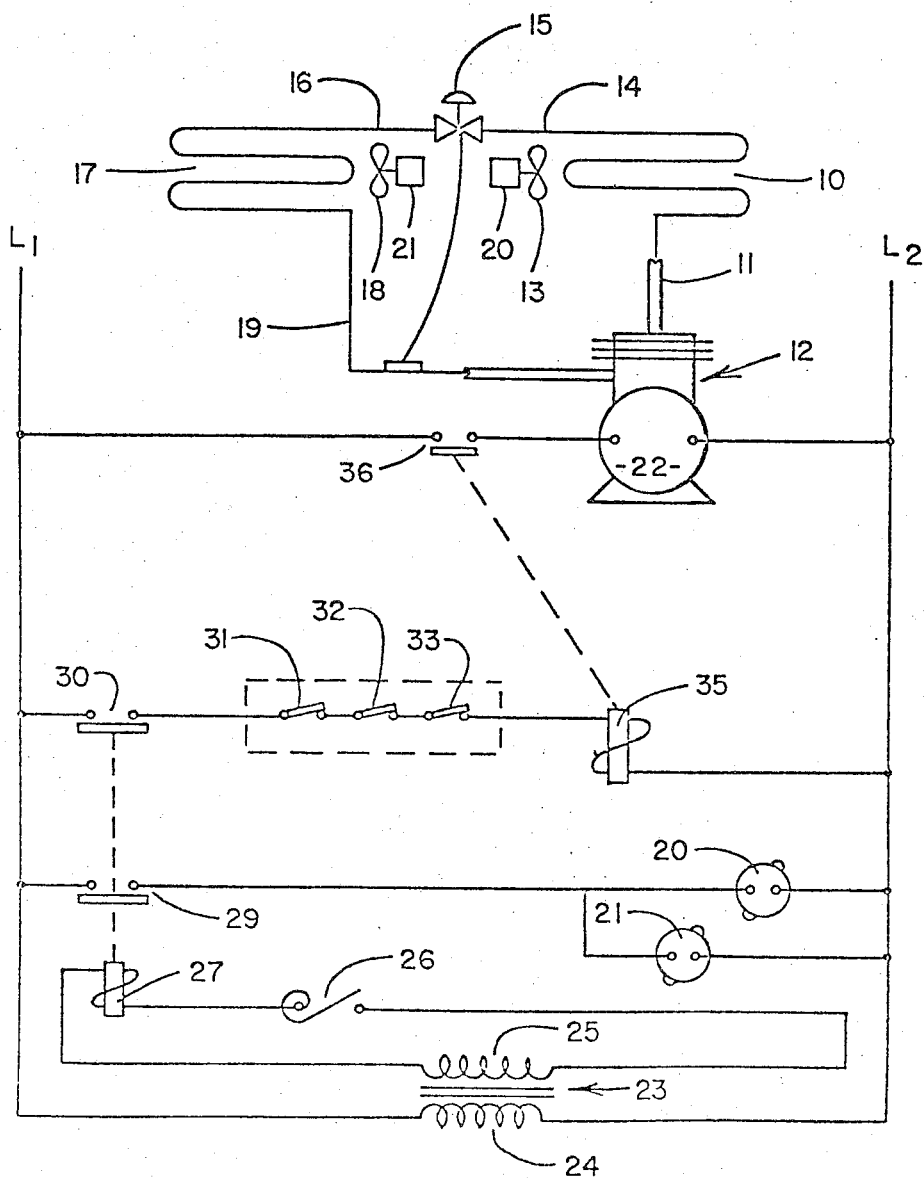
FIG. 1 is a schematic illustration of a type of air conditioning system including a refrigeration unit to which this invention applies.
Figure 2:
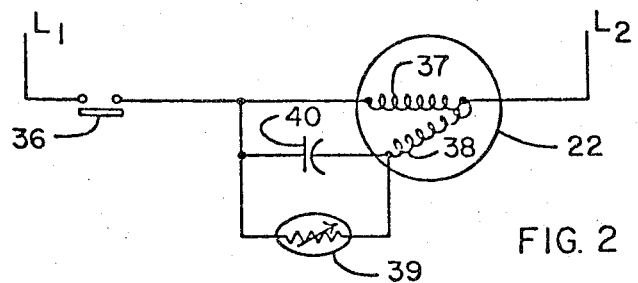
FIG. 2 is a detailed schematic wiring diagram of a portion of the air conditioning system illustrated in FIG. 1, showing a first preferred form of the control in accordance with our invention.

Referring to the drawing and in particular to FIG. 1, there is schematically shown an air conditioning system employing a refrigeration unit incorporating a control arrangement in accordance with our invention. The refrigeration unit disclosed is representative of a type utilized in window-mounted room air conditioners. In referring to the drawings like numerals shall refer to like parts.

An outdoor heat exchange coil or condenser 10 is connected by means of line 11 with the discharge side of a suitable refrigerant compression mechanism, for example, a reciprocating type compressor 12. The gaseous refrigerant produced in compressor 12 flows to condenser 10 and is condensed by ambient air routed over the surface of the condenser by outdoor fan 13. Liquid refrigerant formed in condenser 10 flows through line 14, thermal expansion valve 15, and line 16 to indoor coil or evaporator 17. It is understood that other suitable expansion devices such as a capillary tube, may be employed.

Liquid refrigerant in evaporator 17 is converted to vaporous refrigerant as it extracts heat from the medium to be cooled, for example, air passed over its surface by indoor fan 18. The cool air is discharged into the area being conditioned through a suitable outlet (not shown). Vaporous refrigerant from evaporator 17 flows by suction line 19 to compressor 12 to complete the refrigerant flow cycle.

Again, referring to FIG. 1, a portion of the control circuit for the refrigeration unit hereinabove described is schematically shown. A suitable source of electric power represented by lines $L_1$ and $L_2$, is connected to primary winding 24 of transformer 23. It is understood a polyphase source of electric power may be employed if the circuit is suitably modified.

The secondary winding 25 of transformer 23 is connected in series with switch 26, responsive to the temperature of air circulating in the area being served by the equipment. When thermally actuated switch 26 is closed, current is supplied to control relay 27. Energization of relay 27 closes normally open switches 29 and 30. Once switch 29 has been closed, fan motors 20 and 21 are energized, thereby actuating fans 13 and 18 respectively. The closure of switch 30 supplies current through normally closed switches 31, 32 and 33 to compressor contactor coil 35. Energization of the compressor contactor coil 35 closes normally open switch 36. Closure of normally open switch 36 connects compressor motor 22 across lines $L_1$ and $L_2$, thereby starting compressor 12. Normally closed switches 31, 32 and 33 are safety devices; respectively a high pressure cutout, a low pressure cutout, and a motor overload cutout. Other safety devices known to the art, such as a low oil pressure cutout, may also be used. The occurrence of the condition protected against will open the particular switch thereby either preventing the compressor motor from starting or stopping the compressor motor during the normal operation of the system.

Referring now to FIGS. 2 through 5, various embodiments of our invention are shown.

Motor 22 employed to drive compressor 12 is a single-phase motor. The motor includes main or run winding 37 and auxiliary or start winding 38. The windings are connected in parallel with respect to each other. Capacitor 40 is connected in series with auxiliary winding 38. Capacitor 40 is optimized to obtain maximum normal operating characteristics for motor 22. Connected in parallel with capacitor 40 is temperature responsive resistance element 39, shown as a positive temperature coefficient thermistor. As is known to those skilled in the art, thermistor 39 has a characteristic such that its resistance increases as a function of its temperature.

When switch 36 is closed due to the energization of compressor contactor coil 35, current flows to the auxiliary winding through thermistor 39. The resistance of thermistor 39 is initially at a relatively low level; the current is supplied to the auxiliary winding through both the capacitor and thermistor. This provides a favorable phasing of the starting current to obtain the desired starting torque. When the normal operating speed is obtained, the resistance of thermistor 39 has increased to a relatively high level; therefore the current flow therethrough is substantially eliminated. The current flowing to the auxiliary winding then passes only through capacitor 40. The resistance of thermistor 39 is predetermined so desired starting characteristics for motor 22 is obtained. By employing thermistor 39 and capacitor 40 in the manner shown in FIG. 2, the motor is optimized to obtain desired starting and running characteristics.

Figure 3:
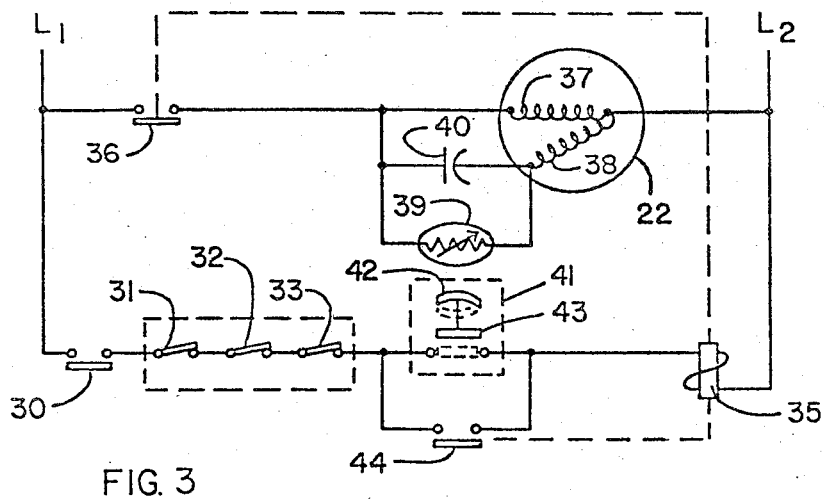
FIG. 3 illustrates a second form of control in accordance with our invention.

Referring to FIG. 3, there is shown a further embodiment of our invention. Switch means 41 is connected in series with contactor coil 35 and safety switches 31, 32, and 33. Switch means 41 includes a temperature responsive element such as bimetallic means 42 connected to a normally closed switch 43. Bimetallic element 42 is responsive to the temperature of thermistor 39.

In addition to closing switch 36, the energization of coil 35 also causes normally open switch 44 to close. The closure of switch 44 provides a shunt about switch means 41 for a reason to be more fully explained hereinafter. Assume switch 43 is in its normally closed position, as represented by the dotted lines in FIG. 3. Thus when switch 30 is closed, coil 35 is energized, closing switches 36 and 44 to start motor 22. As noted hereinbefore the current initially flowing to auxiliary winding 38 passes through thermistor 39. The current causes the temperature level of thermistor 39 to substantially increase.

Bimetallic element 42, which is responsive to the temperature of thermistor 39, warps to a position as represented by the solid lines of FIG. 3, to thereby open switch 43. Since switch 44 is in its closed position, the opening of switch 43 in response to the movement of element 42 has no effect on the normal operation of compressor motor 22.

Assume one of the switches 31, 32, or 33 or thermally responsive switch 26 opens. Upon such occurrence, coil 35 is deenergized, thereby opening switches 36 and 44. The normal operation of the refrigeration unit produces a substantial refrigerant pressure differential between the high pressure and low pressure portions of the unit. If the unit were to be restarted immediately after the supply of energy thereto has been interrupted, a high starting torque motor would be required to overcome the pressure differential.

As noted hereinbefore, single-phase motors have characteristics such that they have limited starting torque available. In view of the same, it is highly desirable to maintain the compressor motor inactive for a period of time after the supply of energy thereto has been interrupted. This permits the refrigerant pressure within the refrigerant circuit to substantially equalize.

Upon the interruption of the supply of current to compressor motor 22, the temperature level of thermistor 39 is still relatively high. Therefore, switch 43 remains in its open position. Even if the switch which has opened to interrupt the supply of energy immediately recloses, the compressor motor cannot be reenergized due to switch 43 being in its open position.

When the temperature of thermistor 39 reaches a relatively normal level, element 42 warps to its dotted line position to close switch 43. Compressor motor 22 may then be energized. The period of time before switch 43 closes is substantially constant; the heat of thermistor 39 is dissipated to the ambient.

The operation of fans 13 and 18 is maintained independent of the operation of compressor 12. Thus, if switch 26 closes, to energize relay 27 to close switch 29, the fans will start even if switch 43 is open. By operating the fans in such a manner, the time required for the pressure differential in the circuit to equalize will be reduced by the passage of the respective media in heat transfer relation with the condenser and evaporator. Thus, when switch 43 closes due to the passage of the predetermined time interval, during which time the temperature of thermistor 39 has returned to its normal level, sufficient torque will be available to start the compressor motor.

Figure 4:
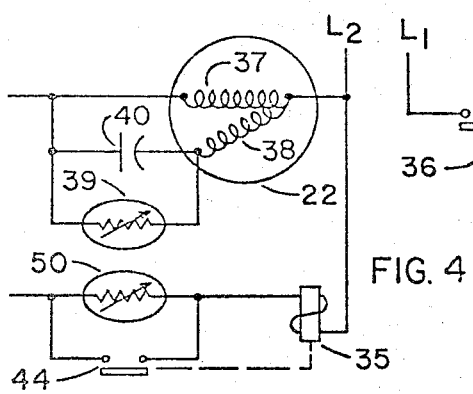
FIG. 4 illustrates a third embodiment in accordance with our invention.

Referring now to FIG. 4, there is shown a further alternative embodiment of our invention. The embodiment illustrated by FIG. 4 is similar to that represented by FIG. 3, except switch means 41 is replaced by a second temperature responsive resistance element 50, shown as a positive temperature coefficient thermistor. Thermistor 50 is responsive to the temperature of thermistor 39.

Upon the initial energization of motor 22, the resistance of thermistor 50 is at a low level so electrical energy is passed therethrough to energize coil 35. Switches 36 and 44 are then closed.

The resistance of thermistor 50 increases due to the increase in temperature of thermistor 39 and also because of the flow of current therethrough. The flow of electrical energy through the thermistor is interrupted; however operation of motor 22 is not effected due to the prior closure of switch 44.

When motor 22 is deenergized, the high resistance of thermistor 50 will prevent immediate reenergization. The resistance of thermistor 50 will decrease to its normal level when its temperature and the temperature of thermistor 39 decrease to their normal level. Reenergization of motor 22 may then occur.

Figure 5:
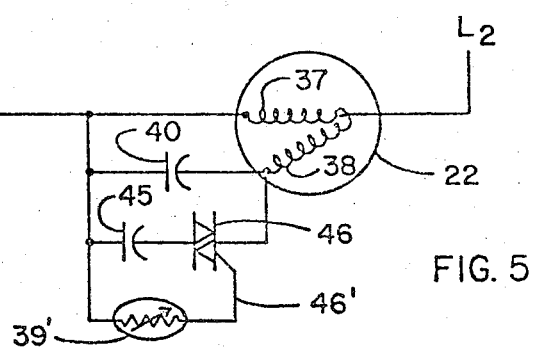
FIG. 5 illustrates a fourth alternative embodiment in accordance with our invention.

Referring now to FIG. 5 there is shown a further modification of our invention.

Connected in parallel with thermistor 39' and capacitor 40 is a second capacitor 45 and switch 46. Switch 46 is preferably a bi-directional gated solid state switch of a type sold under the trademark TRIAC. Switch 46 is provided with a gate 46' in series with thermistor 39'. Capacitor 45 and switch 46 are connected in series with start winding 38.

Upon the closure of switch 36, current passes through thermistor 39', which is similar to but of a lower rating than thermistor 39. The current flow through thermistor 39' during starting conditions is of a sufficient magnitude, that when applied to gate 46, switch 46 conducts. When switch 46 is in a conducting state, the current to start winding 38 passes through both capacitors 40 and 45. Capacitor 45 is optimized to obtain desirable starting characteristics for motor 22.

As the temperature of thermistor 39' increases due to the flow of current therethrough, the current passing to gate 46' of switch 46 is of a lower magnitude. When the current falls below the triggering point, switch 46 is placed in a non-conducting state, thereby interrupting the flow of current from capacitor 45 to auxiliary winding 38. The flow of current to auxiliary winding 38 then passes only through capacitor 40. As noted hereinbefore, capacitor 40 is optimized to obtain maximum running characteristics for the motor.

Figure 6:
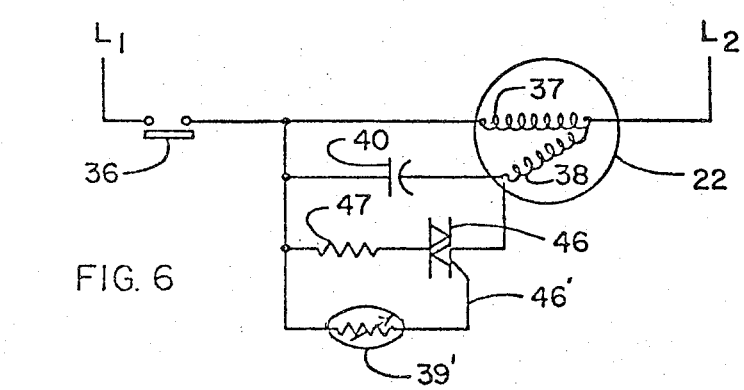
FIG. 6 illustrates a still further embodiment of our invention.

FIG. 6 illustrates a further embodiment of our invention. In lieu of capacitor 45, resistor 47 is connected in series with switch 46. Resistor 47 is optimized to obtain desirable starting characteristics for motor 22. In all other respects, the operation of motor 22 with the circuit shown in FIG. 6 is the same as heretofore described for the circuit shown in FIG. 5.

It should be specifically understood, switch means 41 may be employed with the embodiments shown in FIGS. 5 and 6 to provide those circuits with suitable means for preventing the restarting of a compressor motor immediately after deenergization has occurred.

While we have described and illustrated preferred embodiments of our invention, our invention should not be limited thereto but may be otherwise embodied within the scope of the following claims:

We claim:

1. In an air conditioning system operable to supply treated air to an area including a refrigeration unit comprising a compressor, a condenser, an evaporator and expansion means connected in a closed circuit, a motor for actuating said compressor, said motor having a main winding and an auxiliary winding connected in parallel, the improvement which comprises a control circuit to regulate the operation of the compressor motor of said refrigeration unit comprising:

A. a supply circuit for providing electrical energy to said compressor motor, including thermally responsive switch means operable to energize said supply circuit in response to temperature conditions in said area;

B. a temperature responsive resistance element connected in series with said auxiliary winding of said compressor motor, the resistance of said responsive element substantially increasing as a function of its temperature, the temperature thereof being increased by the flow of current therethrough;

C. first capacitor means connected in series with said auxiliary winding and in parallel with said temperature responsive element, current to said auxiliary winding during starting conditions flowing through both said first capacitor means and said temperature responsive element in a predetermined relationship; current to said auxiliary winding passing only through said capacitor means when the resistance of said element substantially eliminates the flow of current therethrough when normal operating conditions have been obtained; and D. heat sensitive means responsive to the temperature of said resistance element, said heat sensitive means being placed in a state so as to substantially interrupt the flow of electrical energy therethrough in response to the increase of the temperature level of said resistance element, caused by the flow of current therethrough, said heat sensitive means when in its energy interrupting state operating to prevent reenergization of said compressor motor once the supply of electrical energy thereto has been interrupted, reenergization being prevented until said heat sensitive means is placed in a state to permit the passage of energy therethrough in response to the temperature of said resistance element decreasing due to the interruption of current flow therethrough.

2. The combination in accordance with claim 1 further including:
A. means for supplying a heat exchange medium in heat transfer relation with said condenser; and
B. means for supplying electrical energy to said heat exchange medium supply means, said last mentioned means being operable even if the energization of said compressor motor is prevented by the operation of said heat sensitive switch means.

3. The combination in accordance with claim 1 further including:
A. second capacitor means in parallel with said first capacitor means and said temperature responsive resistance element; and
B. switch means connected in series with said second capacitor means and said auxiliary winding; the flow of current through said resistance element during starting conditions acting to place said switch means in a conducting state to provide a flow of current through said second capacitor means to said auxiliary winding; the increased resistance due to the increased temperature of said element during normal operation of said compressor motor limiting the flow of current to said switch means to place said switch means in a nonconducting state to prevent flow of current through said second capacitor means, the flow of current to said auxiliary winding then passing only through said first capacitor means.

4. The combination in accordance with claim 1 further including:
A. resistor means connected in parallel with said first capacitor means and said temperature responsive resistance element; and
B. switch means connected in series with said resistor means and said auxiliary winding; the flow of current through said temperature responsive resistance element during starting conditions acting to place said switch means in a conducting state to provide a flow of current through said resistor means to said auxiliary winding; the increased resistance of said temperature responsive resistance element due to the increased temperature thereof during normal operation of said compressor motor operating to place said switch means in a nonconducting state to prevent flow of current through said resistor means to said auxiliary winding, the flow of current through said auxiliary winding then passing only through said first capacitor means.

5. A control circuit for a motor having a main winding and an auxiliary winding connected in parallel comprising:
A. a supply circuit for providing electrical energy to said motor, including switch means operable to energize said supply circuit, said switch means including a first switch in series with both the main and auxiliary windings;
B. a temperature responsive resistance element connected in series with said auxiliary winding of said motor, the resistance of said element substantially increasing as a function of its temperature, the temperature thereof being increased by the flow of current therethrough; and
C. heat sensitive means responsive to the temperature of the resistance element, said heat sensitive means being placed in a state so as to substantially interrupt the flow of electrical energy therethrough in response to the increase of the temperature level of said resistance element, caused by the flow of current therethrough, said heat sensitive means when in its energy interrupting state operating to prevent reenergization of said motor once the supply of electrical energy thereto has been interrupted, reenergization being prevented until said heat sensitive means is placed in a state to permit the passage of energy therethrough in response to the temperature of said resistance element decreasing due to the interruption of current flow therethrough, said heat sensitive means when in its energy interrupting state functioning to maintain said first switch in a position to prevent flow of the electrical energy to both said main and auxiliary windings.

6. A control circuit in accordance with claim 5 further including:
first capacitor means connected in series with said auxiliary winding and in parallel with said temperature responsive element, current to said auxiliary winding during starting conditions flowing through both said first capacitor means and said temperature responsive element in a predetermined relationship; current to said auxiliary winding passing only through said capacitor means when the resistance of said element substantially eliminates the flow of current therethrough when normal operating conditions have been obtained.

7. A control circuit in accordance with claim 6 further including:
A. second capacitor means in parallel with said first capacitor means and said temperature responsive resistance element; and
B. switch means connected in series with said second capacitor means and said auxiliary winding, the flow of current through said resistance element during starting conditions acting to place said switch means in a conducting state to provide a flow of current through said second capacitor means to said auxiliary winding; the increased resistance due to the increased temperature of said element during normal operation of said motor limiting the flow of current to said switch means to place said switch means in a non-conducting state to prevent flow of current through said second capacitor means, the flow of current to said auxiliary winding then passing only through said first capacitor means.

* * * * *